(12) United States Patent
Hall

(10) Patent No.: US 10,087,066 B1
(45) Date of Patent: Oct. 2, 2018

(54) LIQUID COLLECTION DEVICE THAT CATCHES AND TRANSPORTS, WITHOUT SPILLS, DRAIN WATER FROM A PIECE OF EQUIPMENT, SUCH AS AN ICE TABLE, AND A SYSTEM INCLUDING THE TABLE AND COLLECTION DEVICE

(71) Applicant: M & E Manufacturing Co., Inc., Kingston, NY (US)

(72) Inventor: Donald M. Hall, Mt. Sinai, NY (US)

(73) Assignee: M & E Manufacturing Company, Inc., Kingston, NY (US)

( * ) Notice: Subject to any disclaimer, the term of this patent is extended or adjusted under 35 U.S.C. 154(b) by 0 days.

(21) Appl. No.: 15/216,633

(22) Filed: Jul. 21, 2016

Related U.S. Application Data

(60) Provisional application No. 62/346,307, filed on Jun. 6, 2016, provisional application No. 62/195,127, filed on Jul. 21, 2015.

(51) Int. Cl.
| | | |
|---|---|---|
| *B67D 7/78* | (2010.01) | |
| *B62B 3/02* | (2006.01) | |
| *B65D 41/02* | (2006.01) | |
| *B65D 25/38* | (2006.01) | |
| *B65D 25/28* | (2006.01) | |
| *B65D 47/00* | (2006.01) | |
| *B60P 3/22* | (2006.01) | |

(52) U.S. Cl.
CPC ............... *B67D 7/78* (2013.01); *B60P 3/22* (2013.01); *B62B 3/02* (2013.01); *B65D 25/28* (2013.01); *B65D 25/38* (2013.01); *B65D 41/02* (2013.01); *B65D 47/00* (2013.01)

(58) Field of Classification Search
CPC .. B62B 3/02; B62B 3/00; B62D 39/00; B67D 7/78; B65D 47/00; B60P 3/33
USPC ........................................................ 251/292
See application file for complete search history.

(56) References Cited

U.S. PATENT DOCUMENTS

| | | |
|---|---|---|
| 5,386,787 A | 2/1995 | Hall |
| 5,456,191 A | 10/1995 | Hall |
| 5,471,922 A | 12/1995 | Hall |
| 5,503,087 A | 4/1996 | Hall |
| 5,628,522 A | 5/1997 | Hall |
| 5,957,309 A | 9/1999 | Hall |
| 6,062,401 A | 5/2000 | Hall |
| 6,149,120 A | 11/2000 | Hall |
| 6,322,180 B1 | 11/2001 | Hall |
| 6,366,313 B1 | 4/2002 | Hall |
| 6,419,098 B1 | 7/2002 | Hall |

(Continued)

*Primary Examiner* — Kevin Lee
(74) *Attorney, Agent, or Firm* — Shlesinger, Arkwright & Garvey LLP

(57) ABSTRACT

Liquid collection and transport device includes a liquid collection tank having an inlet on an upper portion and an outlet on a lower portion. There is a detachable cap on the inlet for retaining a liquid in the tank during transport. A drain is provided on the outlet, and the drain has a valve for controlling the collection and removal of liquid from the tank. A cart includes a frame which releasably secures the tank on the cart, and the tank is slidable relative to the frame, so that the location of the drain relative to the cart can be varied. The liquid collection and transport device may have a handle provided on the valve to open and close the valve, the handle being provided adjacent the upper portion of the tank.

13 Claims, 5 Drawing Sheets

(56) References Cited

U.S. PATENT DOCUMENTS

| | | | |
|---|---|---|---|
| 6,450,479 B1* | 9/2002 | Reynolds et al. | B25B 13/48 251/291 |
| 6,474,757 B2 | 11/2002 | Hall | |
| D480,528 S | 10/2003 | Hall | |
| D481,513 S | 10/2003 | Hall | |
| 6,974,042 B2 | 12/2005 | Hall | |
| 7,419,063 B1 | 9/2008 | Hall | |
| 2002/0162813 A1 | 11/2002 | Hall | |
| 2002/0175134 A1 | 11/2002 | Hall | |
| 2003/0127815 A1 | 7/2003 | Hall | |
| 2005/0212233 A1 | 9/2005 | Hall | |
| 2006/0032014 A1* | 2/2006 | Smith | A47L 5/18 15/409 |
| 2012/0318404 A1* | 12/2012 | Ehlers et al. | B65B 31/00 141/8 |
| 2014/0339803 A1* | 11/2014 | Hammer | B23P 19/00 280/830 |
| 2015/0360707 A1* | 12/2015 | Gullino et al. | B62B 3/001 280/659 |
| 2016/0207554 A1* | 7/2016 | Johnson et al. | B62B 3/008 |

\* cited by examiner

LIQUID COLLECTION DEVICE THAT CATCHES AND TRANSPORTS, WITHOUT SPILLS, DRAIN WATER FROM A PIECE OF EQUIPMENT, SUCH AS AN ICE TABLE, AND A SYSTEM INCLUDING THE TABLE AND COLLECTION DEVICE

CROSS-REFERENCE TO RELATED APPLICATIONS

This application claims priority benefit of application No. 62/195,127, filed Jul. 21, 2015, and this application claims priority benefit of application No. 62/346,307, filed Jun. 6, 2016, and each of which is incorporated herein by reference.

FIELD OF THE INVENTION

The present invention relates to a system including a tank detachably attachable to a drain, such as the drain of a work table. The invention relates to a system including a piece of equipment, such as a table, and a tank detachably attached to a drain of the table in the food industry, including grocery stores, food processing plants, and, indeed, ice tables or drain tables such as used for displays in a grocery store or delicatessen.

BACKGROUND OF THE INVENTION

Tables with drains exist.
Tanks for catching liquids from drains of tables exist.
Those tables with drains and existing tanks have drawbacks such as being difficult to use, and being prone to leakage, in use.

OBJECTS AND SUMMARY OF THE INVENTION

An object of the invention is to overcome the drawbacks of the prior art.

Another object of the invention is to overcome the drawbacks of prior art drain tables and existing tanks which are difficult to use, and are prone to leakage, as well as being readily knocked out of position so that either the drain does not drain into the tank, the tank does not close completely, or the filled tank, filled with fluid, cannot be sealed for transport after having been used in position for catching fluids.

In sum, the invention is directed to a system for collecting fluids, such as water, from tables having drains, which overcome the drawbacks of the prior art.

Further, the invention is directed to a tank system for collecting fluids, such as water, from tables having drains, which overcome the drawbacks of the prior art. Such a tank may be provided on a cart, which may be termed a dolly, configured for collecting and transporting a liquid, such as water, without spillage.

The system according to the invention further includes a tank which includes one or both of a vented cap and an unvented cap, as well as a cap for closing the tank which is connectable to a drain hose of a table with a drain.

The system, according to the invention, further includes a cap which mates with the drain hose of a table and which is sufficiently strong and/or large that it secures the drain tank to the table from which the tank is collecting a fluid, such as water.

The system, according to the invention, further includes a drain tank having a drain valve which is conveniently located for ease of actuation by a user; that is, for ease of opening and closing the valve for draining the collected fluid, such as water, from the tank.

This system, according to the invention, further includes that the valve end tank drain are positioned so that the fluid tank drain may be located over a drain in a floor, for example, where the collected fluid is to be drained out of the tank itself.

Further, the inventive system includes that the actuator for that drain valve includes a control, such as a drain handle, which extends to a position for ease of use by the user, such as by being positioned at an upper portion of the drain tank, which may be termed a collection tank or a liquid transport dolly.

The inventive system may include a cart for receiving and transporting the collection tank so that the collection tank may be readily moved, such as by rolling into place under a drain, such as a drain hose, or for being moved into place under a table associated with the collection tank.

The movable cart, which may be termed a carrier, may be sized so that the tank may be easily placed onto and removed from the carrier.

The fluid collection system according to the invention further includes that the drain valve for the fluid collection tank is secured to an end of the tank, includes a valve, such as a ball valve, a support for the valve, an actuator handle, such as a rod, for actuating the valve, and a handle for opening and closing the valve, which may be located at a remote position relative to the valve for ease of use by the user, when the valve is to be actuated for opening and closing the drain for the collection tank.

The inventive system further includes a protective layer, such as a protective end plate and bumper, which covers the valve assembly and the valve actuator for opening and closing the valve, to enhance the rigidity and robustness of the valve assembly.

The inventive fluid collection system further includes that the fluid collection tank is movable relative to the cart on which it is held. In that manner, when the collection and transport tank is in place for releasing the collected liquid, the tank may be moved relative to the cart to locate the collection tank in a desired position for emptying the liquid. As will be appreciated by a person having ordinary skill in the art, the desired position may be a position in which a drain valve on the tank is located over a floor drain, so that the drain valve may then be opened and the collected liquid may then be released.

DETAILED DESCRIPTION OF THE INVENTION

Figure 1:
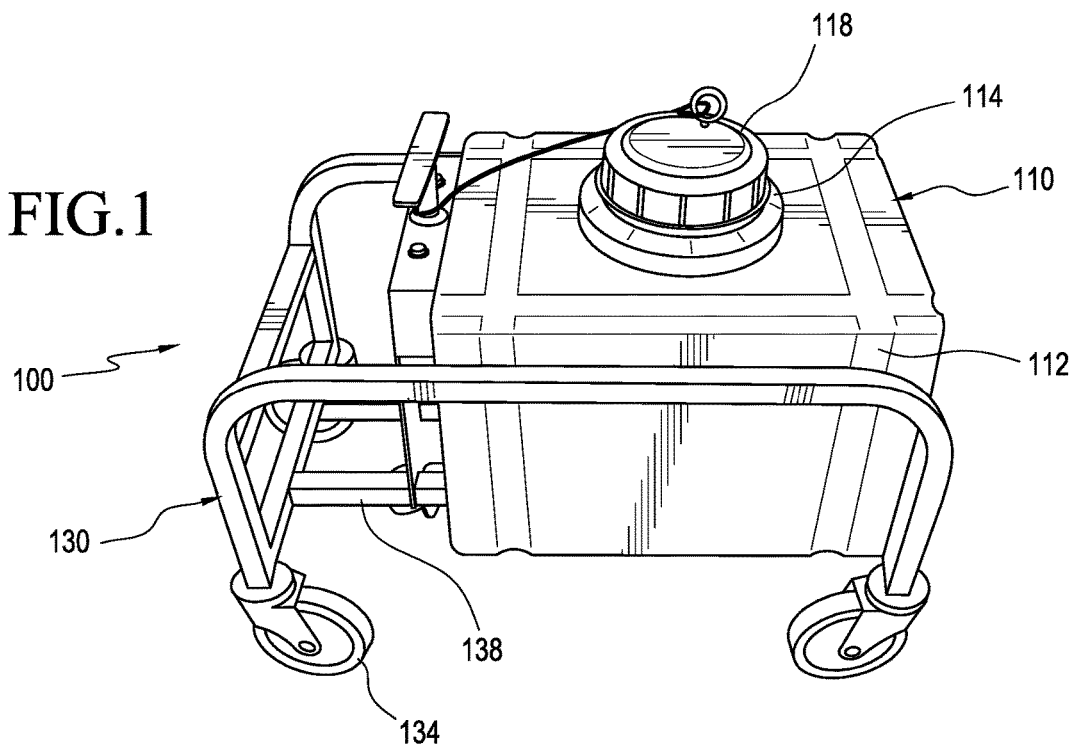
FIG. 1 is a top side perspective view of an embodiment of a liquid collection device according to the invention.
Figure 2:
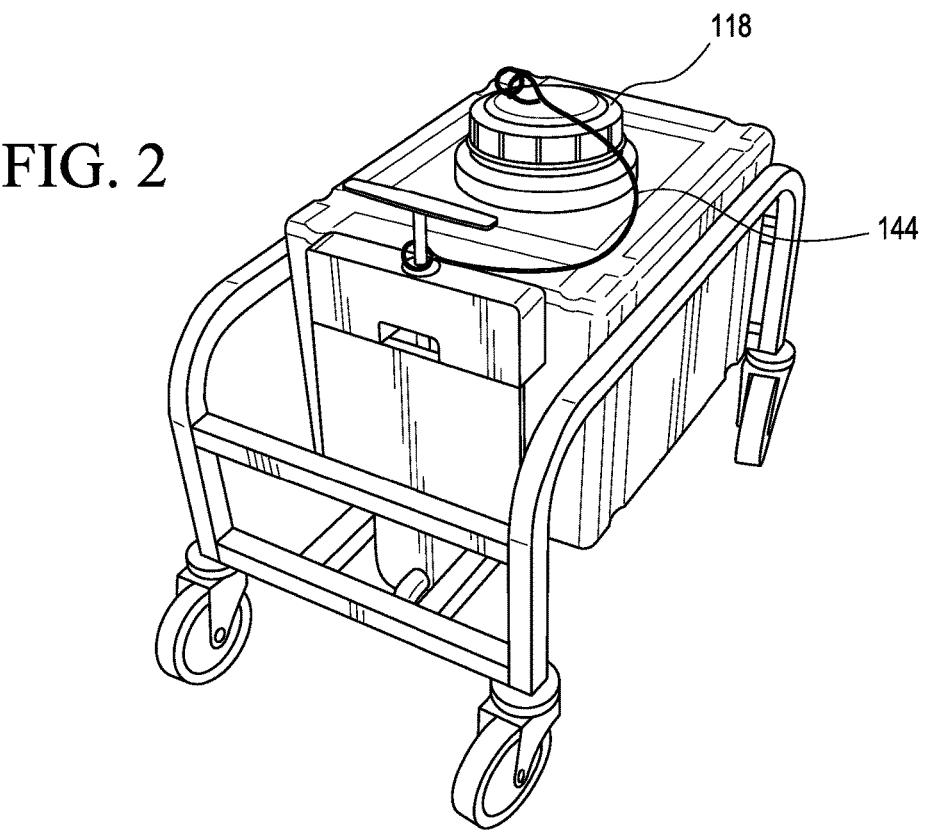
FIG. 2 is a top front perspective view of the embodiment of the liquid collection device of FIG. 1.

FIGS. 1-6 illustrate an embodiment of a liquid collection and transport device 100, which may have a liquid collection tank 110 including an inlet 114 on an upper portion and an outlet on a lower portion. Tank 110 may include one or more ribs 112 for strength.

A detachable cap 118 may be provided on the inlet 114 for retaining a liquid in the tank 110.

A cart 130 may be provided to transport the tank, and cart 130 may have one or more rollers 134. A tank support 138 may be provided that slidably supports tank 110 on cart 130.

A tether 144 may be provided to secure cap 118 to the transport device when cap 118 is not in use cover inlet 114.

A drain assembly 150 including a drain 154 which may be positioned over a floor drain 156 may be provided on the outlet, and drain 154 may have a valve 158 for controlling the removal of liquid from the tank 110.

The frame of the cart 130 may be configured for releasably securing tank 110 on the cart, and tank 110 may be slidable on tank support 138 relative to the frame, so that the location of drain 154 relative to cart 130 can be varied.

A valve handle 162 may be provided for controlling valve 158, and a remote handle 166 may be provided to remotely control valve 158 and to open and close the valve, the handle 166 may be provided adjacent the upper portion of the tank. A rod 168 may be provided between the remote handle 166 and the valve handle 162 to achieve a desired distance between the two.

Figure 3:
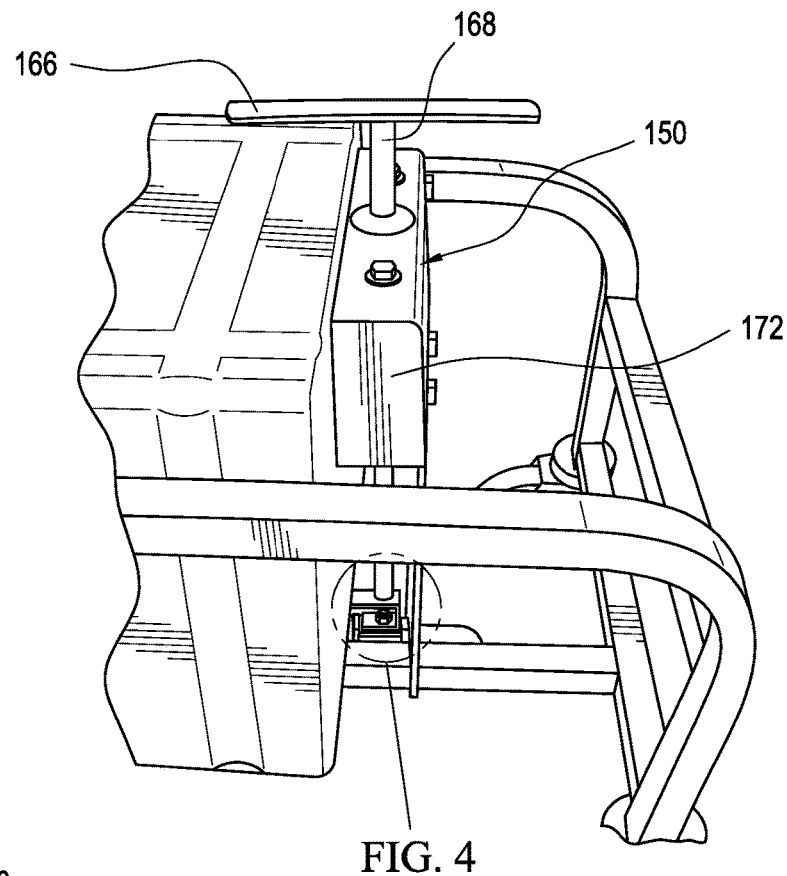
FIG. 3 is a top perspective view of the embodiment of the liquid collection device of FIG. 1.
Figure 4:
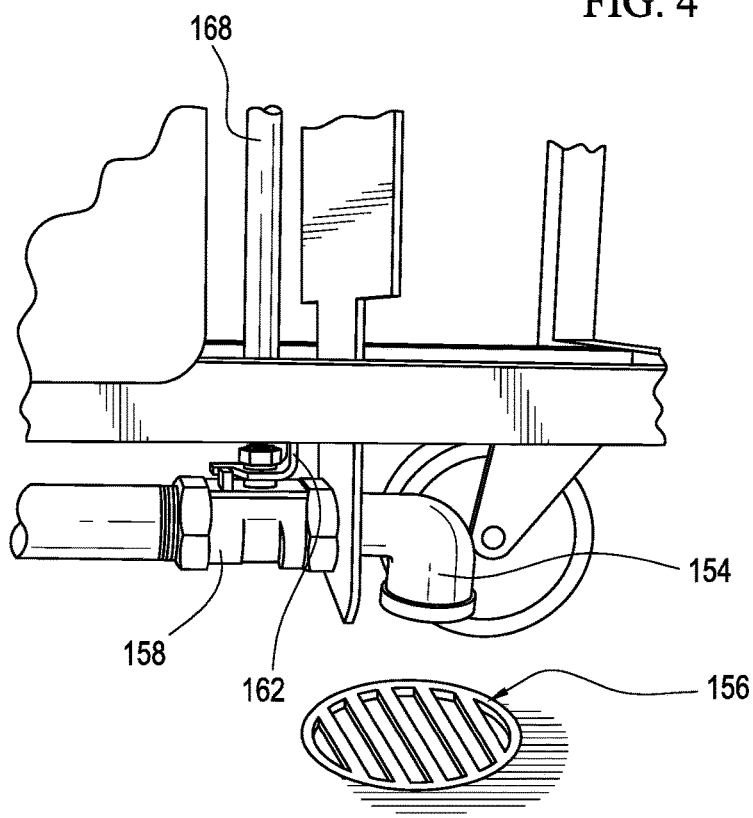
FIG. 4 is a top perspective view of the embodiment of the liquid collection device of FIG. 1.
Figure 5:
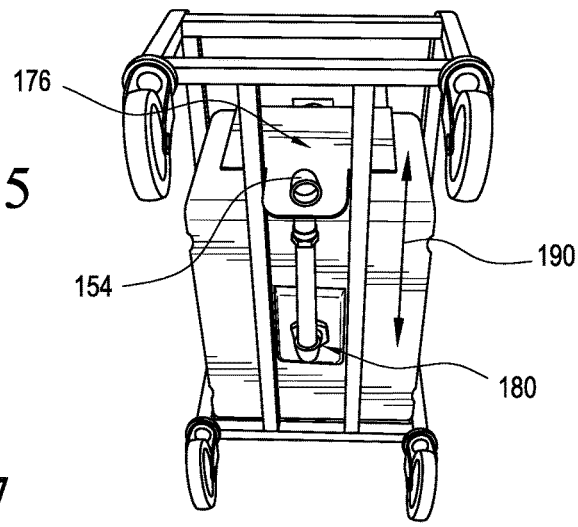
FIG. 5 is a top perspective view of the embodiment of the liquid collection device of FIG. 1.

A free end 172 of drain assembly 150 may be seen in FIG. 3 and a plate 176 may be provided on drain assembly 150 to strengthen and protect it, for example.

A drain 180 may be provided on the outlet of the tank 110, and which drain 180 may be connected to drain 154 by valve 154, as shown and readily appreciated by a person having ordinary skill in the art.

Figure 7:
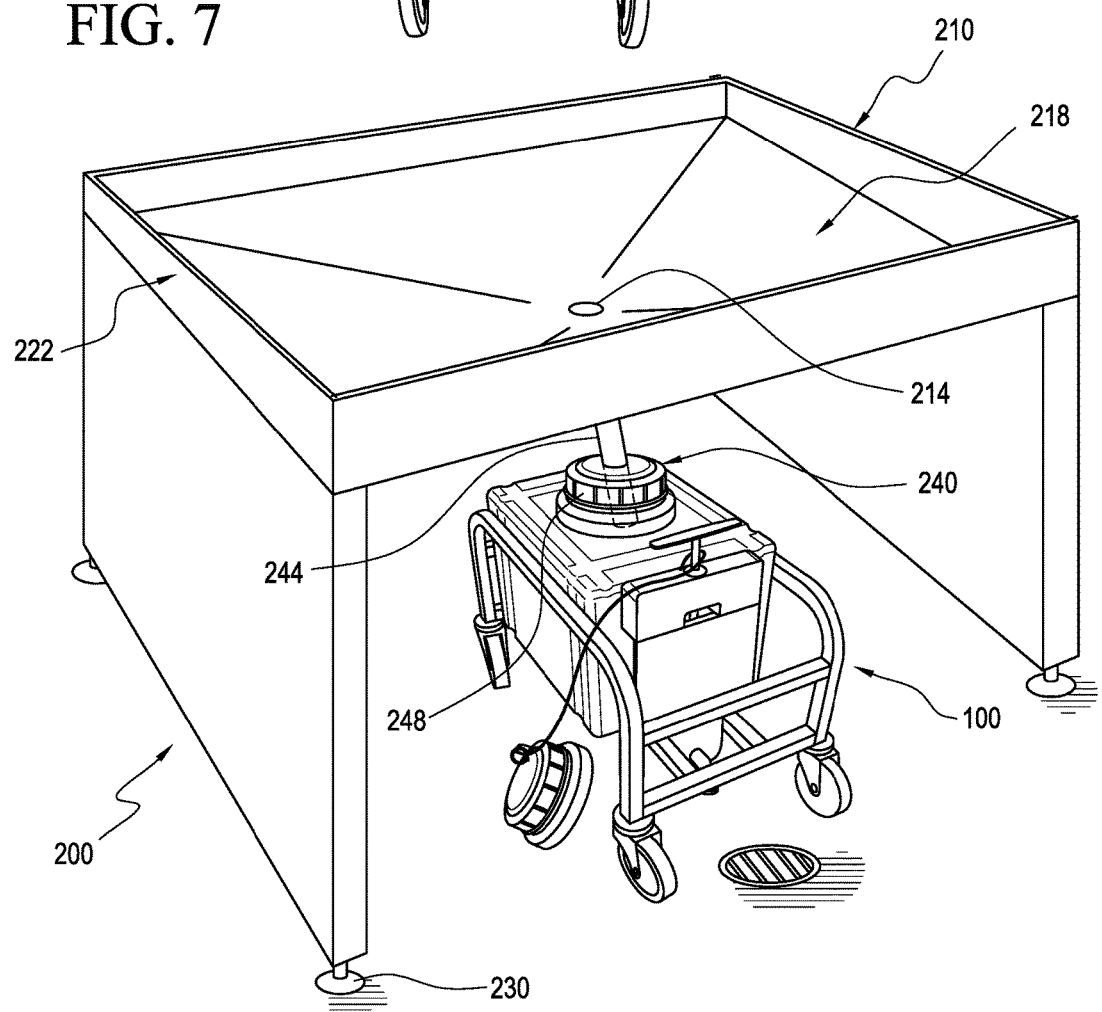
FIG. 7 is a top perspective view of a further embodiment of the invention showing a system according to the invention including an ice table and liquid collection device.

FIG. 7 illustrates an embodiment of a liquid collection and transport system 200 according to the invention, which may include a table, such as an ice display table or ice table 210 having a drain 214 at a lower portion of one or more sloped sides 218. One or more walls 222 may be provided on table 210, such walls may retain ice for cooling a refrigerated product, in use.

A drain assembly 240 including a drain hose 244 may be provided on the drain 214 for draining a liquid from table 210, and a cap 248 may be received on the drain hose.

Figure 9:
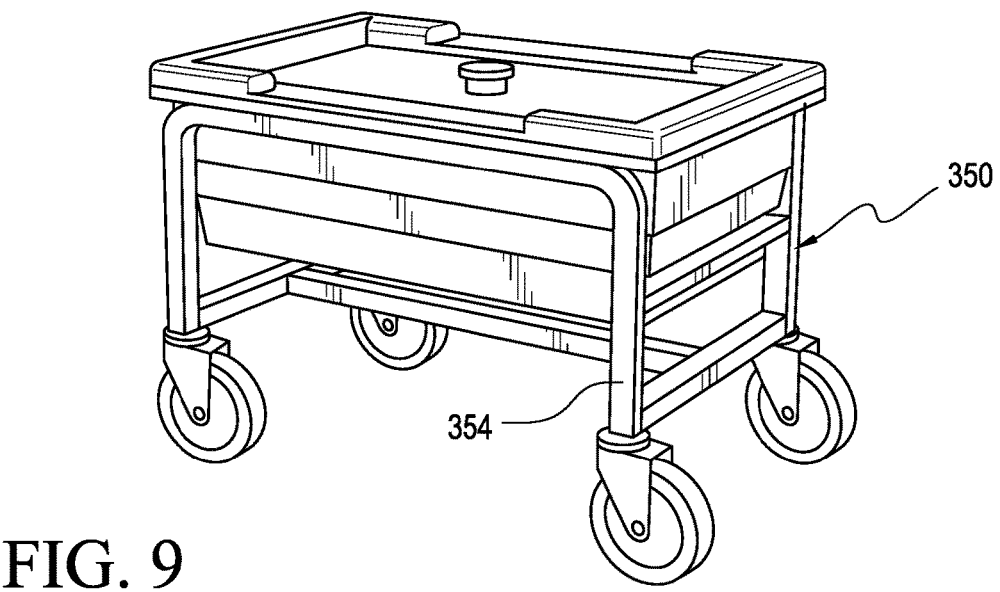
FIG. 9 is a side perspective view of the embodiment of the liquid collection device of FIG. 8.

A liquid collection tank, such as collection tank 100 of FIGS. 1-6, or the tank described below in connection with the embodiment of FIGS. 9 and 10, is detachably attached to table 210 by drain assembly 240. Specifically, by cap 248 on hose 244 being secured to inlet 114 of tank 110 on cart 100.

It will be appreciated that a hole may provided in cap 248 received on the drain hose 244; in other words, drain hose 244 is received in the hole.

Figure 8:
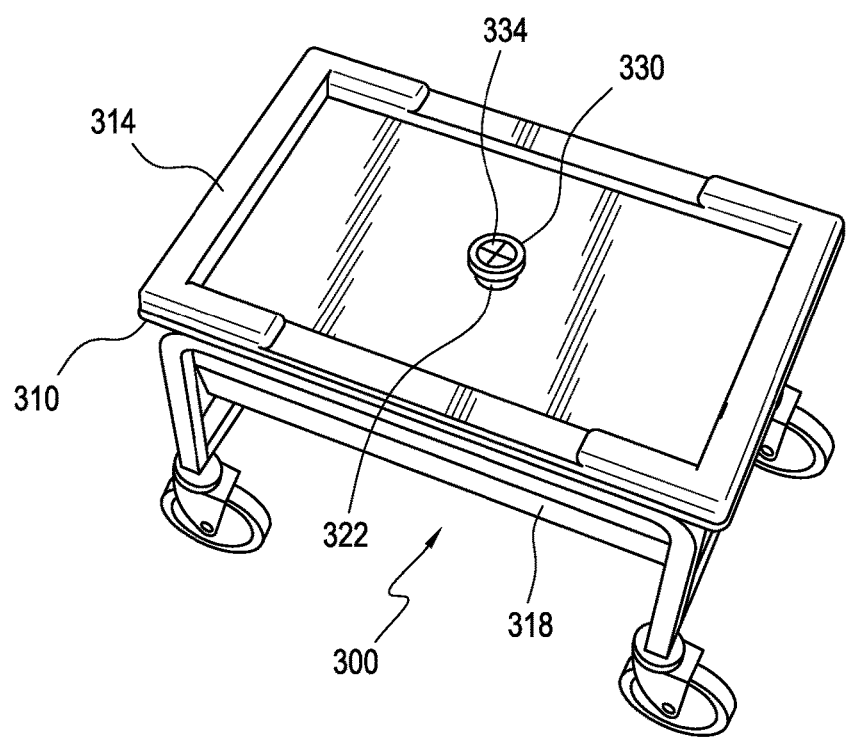
FIG. 8 is a top perspective view of a further embodiment of a liquid collection device according to the invention.

FIGS. 8 and 9 illustrate another embodiment of a liquid collection and transport device 300 according to the invention.

Device 300 may include a liquid collection tank including a base 318 with an open top, a lid 314 provided on the base 318 which closes the open top, and a gasket 310 therebetween.

An inlet 322 may be provided on lid 314, and an outlet may be provided on a lower portion of the base 318.

A cap 330 may be provided on the inlet 322 for retaining a liquid in the tank during transport. The cap 330 may include a flap 334, and the flap retains a liquid during transport, and the cap 330 receives a drain hose of a table which has a drain hose for draining a liquid from the table. Flap 334 may include one more flaps, such as the illustrated four (4) flaps 334, for example.

A cart 350 including a frame 354 may be provided, the frame 354 releasably securing the tank on the cart.

The tank may be slidable relative to the frame 354, so that the location of the drain relative to the cart can be varied.

Figure 6:
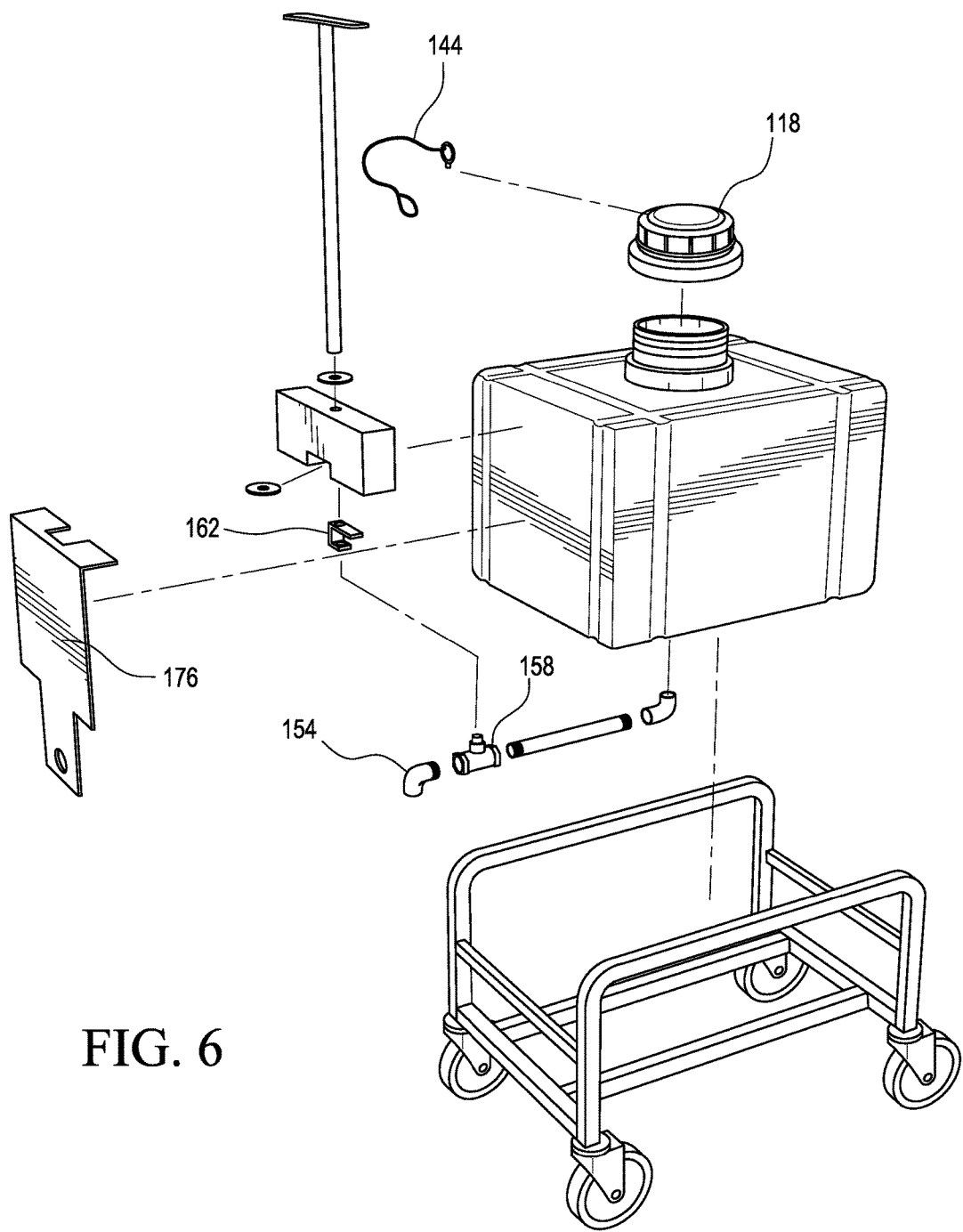
FIG. 6 is an exploded perspective view of the embodiment of the liquid collection device of FIG. 1.

The embodiment of device 300 of FIGS. 8 and 9 may be used with the system of FIG. 6, in which case flap 334 on the cap 330 may be received on the drain hose 244 of FIG. 7, in which case drain hose 244 is received through and secured by the flap 334. The flap 334 retains liquid and prevents liquid from going out the inlet 322 when the liquid collection tank is disconnected from the drain hose of the table, and then transported to a drain location on cart 350.

It can be seen that there is an embodiment of a liquid collection device that catches and transports, without spills, the drain water from another piece of equipment, such as an ice table or ice display.

This invention provides the way and the device to capture water in a water tight/spill proof/slosh proof and air tight but vented container (when the tethered vented lid is utilized).

This invention provides the tank system to transport and empty the tank without lifting the tank by simply opening a valve on the tank itself. While transport tanks that can be emptied are well known this invention includes many unique features as detailed below.

The tank according to the invention may be provided as part of a new upgraded ice display with remote drain valve (no crawling on floor to access) and which allows the user to open or close the ice display drain valve from a standing position, thus allowing the drain water to flow by gravity into the catch tank.

The catch tank may have two (2) threaded lids: one lid is affixed on the drain tube that is part of the ice display and when the movable ventable tank is in position the lid is threaded onto the tank. This secures the tank and ice table together to avoid any unnecessary spills if one or the other of the ice table or movable ventable tank are bumped. The second lid is vented and tethered to the movable ventable tank so that when it is time to transport the drained liquids the drain pipe with lid are unthreaded and the cart is moved out from under the draining equipment, such as the illustrated ice table, and the tethered vented lid is then installed for transport.

The movable ventable tank provides a tank which can be slid rearward in its cradle to engage the down spout on the ice display when it is being positioned under the ice table to capture ice runoff, and then slid forward to disengage the downspout when it is time to empty the tank. This sliding motion coupled with the fact that the transport cart is mobile allows for ease of positioning.

The tank itself can also be slid forward or rearward in its cradle to position the downspout over a floor drain when it has been moved to the drain.

In order to eliminate unnecessary bending the drain valve on the tank is positioned at an ergonomically friendly height.

Said tank has an indicator strip to reflect the tanks condition of empty to full.

Tanks can be offered in any size 8, 10, 12, 14 gallon for instance.

Tanks can be custom molded to include the features of valves and easy access clean out ports.

The transport vehicle complete with the tank can be outfitted with a wagon handle for ease of transport.

The tank can be removed for ease of cleaning.

It is envisioned that the tank and transport cart could have docking/engagement details so that the tank has a tapered bottom to facilitate complete evacuation during draining and the exit stem of the tank could plug into a tapered port on the transport cart which provides the valve. This would reduce the cost for fabrication.

The illustration does not reflect a tall handle on the movable ventable tank.

The ice table can be outfitted with a docking port so the movable ventable tank can be guided towards its home base; i.e., into its docking position.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. A liquid collection and transport device, comprising:
   a) a liquid collection tank including a base with an open top, a lid provided on the base which closes the open top, an inlet provided on the lid, and an outlet provided on a lower portion of the base;
   b) a cap provided on the inlet for retaining a liquid in the tank during transport;
   c) the cap including a flap, the flap retains a liquid during transport, and the cap receives a drain hose of a table which has a drain hose for draining a liquid from the table; and
   d) a cart including a frame, the frame releasably securing the tank on the cart.

2. The liquid collection and transport device according to claim 1, wherein:
   a) the tank is slidable relative to the frame, so that the location of the drain relative to the cart can be varied.

3. The liquid collection and transport device according to claim 1, wherein:
   a) a drain is provided on the outlet, the drain having a valve for controlling the collection and removal of liquid from the tank.

4. The liquid collection and transport device according to claim 1, wherein:
   a) the flap includes a number of flaps.

5. A liquid collection and transport system, comprising:
   a) a table having a drain, a drain hose provided on the drain for draining a liquid from the table, and a cap received on the drain hose;
   b) a liquid collection tank including an inlet on an upper portion and an outlet on a lower portion, and the inlet being detachably attached to the cap of the table received on the drain hose;
   c) a detachable cap provided on the inlet for retaining a liquid in the tank during transport;
   d) a drain provided on the outlet, and the drain having a valve for controlling the collection and removal of liquid from the tank;
   e) a cart including a frame, the frame releasably securing the tank on the cart; and
   f) the tank being slidable relative to the frame, so that the location of the drain relative to the cart can be varied.

6. The liquid collection and transport system according to claim 5, wherein:
   a) a hole is provided in the cap received on the drain hose, the drain hose is received in the hole.

7. The liquid collection and transport system according to claim 6, wherein:
   a) a flap is provided on the cap received on the drain hose, the drain hose is received in the hole and secured by the flap and the hole, and the flap retains liquid in the inlet when the liquid collection tank is disconnected from the drain hose of the table.

8. A liquid collection and transport system, comprising:
   a) a table having a drain, a drain hose provided on the drain for draining a liquid from the table;
   b) a liquid collection tank including an inlet on an upper portion, and the inlet receiving the drain hose;
   c) a cart including a frame, the frame releasably securing the tank on the cart; and
   d) the tank being slidable relative to the frame.

9. The liquid collection and transport system according to claim 8, wherein:
   a) an outlet is provided on a lower portion of the liquid collection tank; and
   b) a drain is provided on the outlet, and the drain has a valve for controlling the collection and removal of liquid from the tank.

10. The liquid collection and transport system according to claim 8, wherein:
    a) a detachable cap is provided on the inlet for retaining a liquid in the tank during transport.

11. The liquid collection and transport system according to claim 10, wherein:
    a) a hole is provided in the cap, and the hole receives the drain hose.

12. The liquid collection and transport system according to claim 9, wherein:
    a) a handle is provided on the valve to open and close the valve.

13. The liquid collection and transport system according to claim 12, wherein:
    a) the handle is provided adjacent the upper portion of the tank.

* * * * *